US012236665B2

(12) United States Patent
Choi et al.

(10) Patent No.: US 12,236,665 B2
(45) Date of Patent: Feb. 25, 2025

(54) METHOD AND APPARATUS WITH NEURAL NETWORK TRAINING

(71) Applicant: Samsung Electronics Co., Ltd., Suwon-si (KR)

(72) Inventors: Hee Min Choi, Seoul (KR); Hyoa Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 17/550,184

(22) Filed: Dec. 14, 2021

(65) Prior Publication Data

US 2022/0237890 A1 Jul. 28, 2022

(30) Foreign Application Priority Data

Jan. 22, 2021 (KR) .................. 10-2021-0009670
May 13, 2021 (KR) .................. 10-2021-0061877

(51) Int. Cl.
*G06V 10/762* (2022.01)
*G06N 3/045* (2023.01)
*G06V 20/58* (2022.01)

(52) U.S. Cl.
CPC .......... *G06V 10/762* (2022.01); *G06N 3/045* (2023.01); *G06V 20/58* (2022.01)

(58) Field of Classification Search
CPC ...... G06V 10/762; G06V 20/58; G06N 3/045; G06N 3/044; G06N 3/048; G06N 3/063;
(Continued)

(56) References Cited

U.S. PATENT DOCUMENTS

| 10,089,576 B2 | 10/2018 | Gao et al. |
| 2020/0387782 A1 | 12/2020 | Hegde et al. |

(Continued)

FOREIGN PATENT DOCUMENTS

| CN | 108389576 B | 9/2020 |
| CN | 111723914 A | 9/2020 |

(Continued)

OTHER PUBLICATIONS

Yuki Markus Asano et al: "Self-labelling via simultaneous clustering and representation learning", arxiv.org:1911.05371v3, Cornell University Library, 201 Olin Library Cornell University Ithaca, NY 14853, Nov. 13, 2019 (Nov. 13, 2019), XP081603273 (Year: 2019).*

(Continued)

*Primary Examiner* — Nancy Bitar
*Assistant Examiner* — Heath E. Wells
(74) *Attorney, Agent, or Firm* — NSIP Law

(57) ABSTRACT

A processor-implemented method with neural network training includes: determining first backbone feature data corresponding to each input data by applying, to a first neural network model, two or more sets of the input data of the same scene, respectively; determining second backbone feature data corresponding to each input data by applying, to a second neural network model, the two or more sets of the input data, respectively; determining projection-based first embedded data and dropout-based first view data from the first backbone feature data; and determining projection-based second embedded data and dropout-based second view data from the second backbone feature data; and training either one or both of the first neural network model and the second neural network model based on a loss determined based on a combination of any two or more of the first embedded data, the first view data, the second (Continued)

embedded data, the second view data, and an embedded data clustering result.

25 Claims, 12 Drawing Sheets

(58) Field of Classification Search
CPC .......... G06N 3/084; G06N 3/082; G06N 3/08; G01S 17/931; G06F 18/2321
USPC .......................................................... 382/103
See application file for complete search history.

(56) References Cited

U.S. PATENT DOCUMENTS

| | | | |
|---|---|---|---|
| 2021/0192357 A1* | 6/2021 | Sinha ..................... | G06N 3/084 |
| 2021/0286923 A1* | 9/2021 | Kristensen .............. | G01S 7/412 |
| 2022/0138454 A1* | 5/2022 | Zhao ....................... | G06V 40/16 |
| | | | 382/156 |
| 2022/0172046 A1* | 6/2022 | Nishiyuki .............. | G06N 3/045 |

FOREIGN PATENT DOCUMENTS

| | | |
|---|---|---|
| CN | 111724867 A | 9/2020 |
| CN | 111832701 A | 10/2020 |
| KR | 10-2020-0010993 A | 1/2020 |
| KR | 10-2102181 B1 | 5/2020 |
| KR | 10-2020-0119377 A | 10/2020 |
| WO | WO 2019/222401 A2 | 11/2019 |
| WO | WO 2019/222401 A3 | 11/2019 |

OTHER PUBLICATIONS

Geoffrey French et al: "Self-ensembling for visual domain adaptation", arxiv.org, 1706.05208v4 Cornell University Library, 201 Olin Library Cornell University Ithaca, NY 14853, Jun. 16, 2017 (Jun. 16, 2017), XP081322829 (Year: 2017).*
"Self-labelling via simultaneous clustering and representation learning", Yuki Markus Asano et al: arxiv.org:1911.05371v3, Cornell University Library, 201 Olin Library Cornell University Ithaca, NY 14853, Nov. 13, 2019 (Nov. 13, 2019), XP081603273 (Year: 2019).*
"Self-ensembling for visual domain adaptation", Geoffrey French et al: arxiv.org, 1706.05208v4 Cornell University Library, 201 Olin Library Cornell University Ithaca, NY 14853, Jun. 16, 2017 (Jun. 16, 2017), XP081322829 (Year: 2017).*
Unsupervised Learning of Visual Features by Contrasting Cluster Assignments, by Caron, Mathilde, Misra, Ishan, Mairal, Julien, Goyal, Priya, Bojanowski, Piotr, Joulin, Armand, ARXIV ID: 2006.09882, Jun. 17, 2020 (Year: 2020).*
French, Geoffrey, et al., "Self-ensembling for visual domain adaptation." arXiv preprint arXiv:1706.05208, Jun. 16, 2017, (20 pages in English).
Ji, Xu, et al., "Invariant information clustering for unsupervised image classification and segmentation." Proceedings of the IEEE/CVF International Conference on Computer Vision. 2019, p. 9864-9873.
Asano, Yuki Markus, et al., "Self-labelling via simultaneous clustering and representation learning." arXiv preprint arXiv:1911.05371, Nov. 13, 2019, (22 pages in English).
Extended European search report issued Aug. 11, 2022, in counterpart European Patent Application No. 22151396.3 (13 pages in English).
Yan, Xueting, et al. "ClusterFit: Improving Generalization of Visual Representations." *Proceedings of the IEEE/CVF Conference on Computer Vision and Pattern Recognition*, pp. 6509-6518 (2020).
He, Kaiming, et al. "Momentum Contrast for Unsupervised Visual Representation Learning." *Proceedings of the IEEE/CVF Conference on Computer Vision and Pattern Recognition*. pp. 9729-9738 (2020).
Chen, Ting, et al. "A Simple Framework for Contrastive Learning of Visual Representations." *International conference on machine learning*. PMLR, 2020 (11 pages in English).
Koohpayegani, Soroush Abbasi, et al. "CompRess: Self-Supervised Learning by Compressing Representations." *34$^{th}$ Conference on Neural Information Processing Systems (NeurIPS)*, Vancouver, Canada. arXiv:2010.14713 (Oct. 28, 2020). (16 pages in English).
Caron, Mathilde, et al. "Unsupervised Learning of Visual Features by Contrasting Cluster Assignments." *34$^{th}$ Conference on Neural Information Processing Systems (NeurIPS)*, Vancouver, Canada. arXiv:2006.09882v5 (Jan. 8, 2021). (23 pages in English).
Choi, Hee Min, et al. "Unsupervised Representation Transfer for Small Networks: I Believe I Can Distill On-the-Fly." *35$^{th}$ Conference on Neural Information Processing Systems (NeurIPS)*, Sydney, Australia, Advances in Neural Information Processing Systems vol. 34 (2021). (14 pages in English).

\* cited by examiner

METHOD AND APPARATUS WITH NEURAL NETWORK TRAINING

CROSS-REFERENCE TO RELATED APPLICATIONS

This application claims the benefit under 35 USC § 119 (a) of Korean Patent Application No. 10-2021-0009670 filed on Jan. 22, 2021, and Korean Patent Application No. 10-2021-0061877 filed on May 13, 2021, in the Korean Intellectual Property Office, the entire disclosures of which are incorporated herein by reference for all purposes.

BACKGROUND

1. Field

The following description relates to a method and apparatus with neural network training.

2. Description of Related Art

The technological automation of processes such as recognition (for example, pattern recognition) may be implemented through processor-implemented neural network models, as specialized computational architectures, which, after substantial training, may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example.

The above description has been possessed or acquired by the inventor(s) in the course of conceiving the present disclosure and is not necessarily an art publicly known before the present application is filed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with neural network training includes: determining first backbone feature data corresponding to each input data by applying, to a first neural network model, two or more sets of the input data of the same scene, respectively; determining second backbone feature data corresponding to each input data by applying, to a second neural network model, the two or more sets of the input data, respectively; determining projection-based first embedded data and dropout-based first view data from the first backbone feature data; determining projection-based second embedded data and dropout-based second view data from the second backbone feature data; and training either one or both of the first neural network model and the second neural network model based on a loss determined based on a combination of any two or more of the first embedded data, the first view data, the second embedded data, the second view data, and an embedded data clustering result.

The training may include determining a first partial loss based on a code value indicating a cluster to which embedded data of the first embedded data extracted based on the first neural network model from one input data of the two or more sets of input data belongs, and on embedded data of the first embedded data extracted based on the first neural network model from another input data of the two or more sets of input data.

The determining of the first partial loss may include determining the first partial loss based further on view data of the first view data extracted using the first neural network model from one input data of the two or more sets of input data and a clustering result.

The training may include determining a second partial loss based on a code value indicating a cluster to which embedded data of the first embedded data extracted based on the first neural network model from one input data of the two or more sets of input data belongs, and on embedded data of the second embedded data extracted based on the second neural network model from another input data of the two or more input data.

The the determining of the second partial loss may include determining the second partial loss based further on view data of the second view data extracted based on the second neural network model from one input data of the two or more sets of input data and on a code value.

The training may include determining a first partial loss associated with the first neural network model and a second partial loss associated with the second neural network model, based on a cross entropy loss between a code value and any one of the first embedded data, the first view data, the second embedded data, and the second view data.

The training may include determining a third partial loss using a gradient reversal (GR) layer from the first embedded data and the second embedded data.

The method may include generating, from original data which is a color image obtained by a camera sensor, the two or more sets of input data, based on data augmentation comprising any one or any combination of any two or more of random noise addition, image rotation, scale adjustment, image movement, random crop, and color distortion.

The method may include generating, from original data which is a light detection and ranging (lidar) image obtained by a lidar sensor, the two or more sets of input data, based on data augmentation comprising either one or both of sensing point augmentation and reflection value adjustment.

The method may include: generating one input data of the two or more sets of input data by capturing a scene using a sensor among a plurality of sensors; and generating another input data of the two or more sets of input data by capturing the same scene using a sensor of another type among the sensors.

The method may include: determining projected first embedded data from the first backbone feature data, using a first projection model; determining projected first view data from the first backbone feature data, using a first drop model comprising one or more dropout layers; determining projected second embedded data from the second backbone feature data, using a second projection model; and determining projected second view data from the second backbone feature data, using a second drop model comprising one or more dropout layers.

The determining of the first view data may include applying a dropout layer after applying a linear layer to the first embedded data, and the determining of the second view data may include applying a dropout layer after applying a linear layer to the second embedded data.

A number of parameters of the first neural network model my be greater than a number of parameters of the second neural network model.

The method may include determining any one of a code value indicating a cluster to which embedded data output by a model having a greatest recognition performance among a plurality of neural network models comprising the first neural network model and the second neural network model belongs, a code value for each embedded data output by each of the models, and a code value indicating a cluster to which embedded data output by a model having a least clustering loss belongs.

The determining of the second backbone feature data may include: transforming the two or more sets of input data based on a format defined by target hardware; and inputting, to the second neural network model, transformed data obtained by the transforming.

The training may include updating parameters of the second neural network model such that the determined loss is minimized.

The method may include generating an inference result of a target task of sensing data, using embedded data extracted from the sensing data based on the second neural network model for which the training is completed.

The method may include controlling an operation of an electronic apparatus storing therein the second neural network model based on the inference result.

The inference result may correspond to any one or any combination of an object recognition, an object classification, an identity verification, an object detection, and a language recognition.

In another general aspect, one or more embodiments include a non-transitory computer-readable storage medium storing instructions that, when executed by a processor, configure the processor to perform any one, any combination, or all operations and methods described herein.

In another general aspect, an apparatus with neural network training includes: a memory configured to store therein a first neural network model and a second neural network model; and a processor configured to determine first backbone feature data corresponding to each input data by applying two or more sets of the input data of the same scene, respectively, to the first neural network model, determine second backbone feature data corresponding to each input data by applying the two or more sets of the input data, respectively, to the second neural network model, determine projection-based first embedded data and dropout-based first view data from the first backbone feature data, determine projection-based second embedded data and dropout-based second view data from the second backbone feature data, and train either one or both of the first neural network model and the second neural network model based on a loss determined based on a combination of any two or more of the first embedded data, the first view data, the second embedded data, the second view data, and a code value indicating a cluster to which the first embedded data belongs.

In another general aspect, a processor-implemented method with neural network training includes: determining first backbone feature data and second backbone feature data, respectively, by applying first and second input data of different views of a same scene to each of a first neural network and a second neural network; determining first projection-based embedded data and first dropout-based view data based on the first backbone feature data, and second projection-based embedded data and second dropout-based view data based on the second backbone feature data; determining a first partial loss based on the first embedded data and code values indicating one or more clusters to which the first embedded data belongs; determining a second partial loss based on the second embedded data and the code values; and training either one or both of the first neural network and the second neural network based on the first partial loss and the second partial loss.

The code values may include a first code value indicating a cluster to which embedded data of the first embedded data belongs, and a second code value indicating a cluster to which other embedded data of the first embedded data belongs.

The determining of the second partial loss may include: determining a first cross loss between embedded data of the second embedded data and the second code value; and determining a second cross loss between other embedded data of the second embedded data and the first code value.

The determining of the first partial loss may include: determining a first cross loss between the embedded data of the first embedded data and the second code value; and determining a second cross loss between the other embedded data of the first embedded data and the first code value.

Other features and aspects will be apparent from the following detailed description, the drawings, and the claims.

Figure 1:
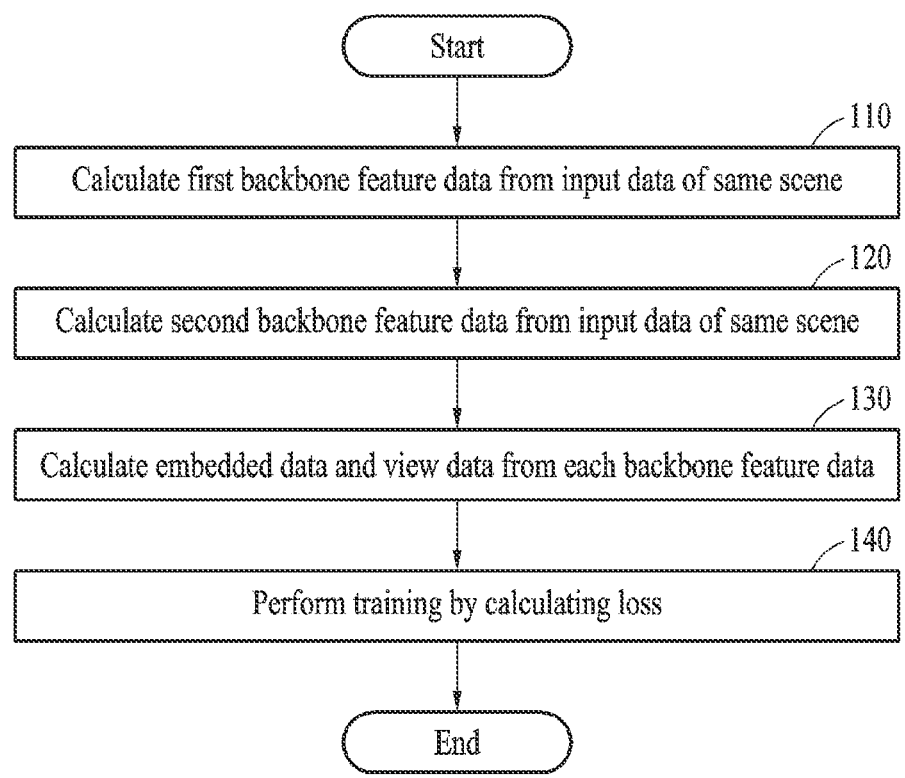
FIG. 1 illustrates an example of a training method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. It will be further understood that, as used herein, the terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of a training method.

In operation 110, an electronic apparatus may calculate first backbone feature data from input data of the same scene. In one example, the electronic apparatus may calculate first backbone feature data corresponding to each input data by applying, to a first neural network model, two or more sets of input data of the same scene, respectively. For example, the electronic apparatus may extract m sets of first backbone feature data by respectively inputting m sets of input data to the first neural network model. In this example, m may be an integer greater than or equal to 2. For example, the two or more sets of input data may be data on the same context (for example, data augmented from one original image of one scene and/or data obtained by capturing the same scene by different sensors). For another example, the two or more sets of input data may be data augmented from one original signal of one sound (e.g., voice or speech) and/or data obtained by capturing the same sound by different sensors.

In operation 120, the electronic apparatus may calculate second backbone feature data from the input data of the same scene. In one example, the electronic apparatus may calculate second backbone feature data corresponding to each input data by applying, to a second neural network model, two or more sets of input data, respectively. For example, the electronic apparatus may extract m sets of second backbone feature data by inputting m sets of input data respectively to the second neural network model.

A machine learning model may be generated through machine learning, and may also be referred to as a neural network model. This learning may be performed, for example, in the electronic apparatus itself in which the neural network model is performed, or be performed through a separate server. A learning algorithm may include, for example, supervised learning, unsupervised learning, semi-supervised learning, and/or reinforcement learning, but examples of which are not limited to the foregoing examples. The neural network model may include a plurality of artificial neural network layers. The neural network model may include, for example, a deep neural network (DNN), a convolutional neural network (CNN), a recurrent neural network (RNN), a restricted Boltzmann machine (RBM), a deep belief network (DBN), and a bidirectional recurrent DNN (BRDNN), a deep Q-network, or a combination of two or more thereof, but examples of which are not limited to the foregoing examples. The neural network model may additionally or alternatively include a software structure, in addition to a hardware structure. The electronic apparatus may extract backbone feature data by inputting data to the neural network model and propagating the input data. The backbone feature data may be data abstracted from the input data and may have a form of a feature vector, for example. The backbone feature data may be propagated to a subsequent layer of the neural network model to generate an inference result corresponding to a target task, for example, object recognition, object classification, identity verification, object detection, and language recognition, and the like.

In operation 130, the electronic apparatus may calculate embedded data and view data from each backbone feature data. In one example, the electronic apparatus may calculate projection-based first embedded data and dropout-based first view data from the first backbone feature data, and calculate projection-based second embedded data and dropout-based second view data from the second backbone feature data. The first embedded data and the first view data may represent a feature vector embedded in a first embedding space of the first neural network model, and the second embedded data and the second view data may represent a feature vector embedded in a second embedding space of the second neural network model. Hereinafter, non-limiting examples of projection and dropout will be described in detail with reference to FIGS. 4 and 5, respectively.

As described above, the electronic apparatus may calculate feature data of various views from data that is the same source. For example, m sets of input data may be obtained for one context, for example, one scene, backbone feature data may be extracted from each of the m sets of input data for each neural network model, and embedded data and view data may be calculated for each backbone feature data. For example, when the electronic apparatus includes n neural network models, the electronic apparatus may determine feature data of m×n×2 views. In this example, n may be an integer greater than or equal to 2. A view described herein may refer to a viewpoint from which data is viewed.

In operation 140, the electronic apparatus may perform training by calculating a loss. In one example, the electronic apparatus may train either one or both of the first neural network model and the second neural network model based on a loss that is calculated based on a combination of any two or more of the first embedded data, the first view data, the second embedded data, the second view data, and an embedded data clustering result. For example, the electronic apparatus may update parameters of the neural network model such that a sum of partial losses calculated based on the first embedded data, the first view data, the second embedded data, the second view data, and the clustering result is minimized. For example, the electronic apparatus may update parameters of the second neural network model until the calculated loss becomes less than a threshold loss or converges to be minimized. The electronic apparatus may iteratively update the parameters of the neural network model until the calculated loss becomes less than the threshold loss.

The electronic apparatus may train neural network models without a label indicating a class to which an input image belongs. The electronic apparatus may train a neural network model to increase a distance in an embedding space between sets of feature data extracted by executing the neural network model for data of different classes, for example, different scenes, and to decrease a distance in an embedding space between sets of feature data extracted for data of the same class, for example, the same scene. To generate an inference result for a target task, post-processing and/or additional network training may be needed in addition to the training operation described above.

Unsupervised visual representation learning may be based on heavy networks with large batch training. Such learning may considerably reduce a gap between supervised performance and unsupervised performance of deep models such as ResNet-50, but this is relatively limited for small models.

An unsupervised learning framework for small networks of one or more embodiments may integrate deep self-supervised representation learning and knowledge distillation into a single training process. A teacher model of one or more embodiments may be trained to generate consistent clustering between different views of the same image. Meanwhile, a student model of one or more embodiments may be trained to mimic a prediction of an on-the-fly self-supervised teacher.

For an effective knowledge transfer, a domain classifier of one or more embodiments may guide the student model to feature learning with discriminative features invariant to a distribution shift. A dropout-based multi-view generation method of one or more embodiments may assist in capturing useful feature information included in a network itself.

In an extensive analysis, a student model that is trained according to example embodiments described herein may outperform state-of-art offline distilled networks from advanced and more powerful self-supervised teachers. For example, a ResNet-18 student model that is trained with a ResNet-50 teacher model according to a training method to be described hereinafter achieved ImageNet Top-1 accuracy of 68.32% in a linear evaluation, which is only 1.44% below a supervised baseline.

Unsupervised and self-supervised learning may be associated with effective learning of useful representations from numerous sets of unlabeled data. Self-supervised visual representation learning methods may be close to or outperform fully-supervised methods.

Typical unsupervised visual representation learning may be associated with the use of big models trained on powerful computing resources. The smallest model used in typical unsupervised visual representation learning may be ResNet-50, and networks may be trained with large batches (e.g., 4096 images) on multiple specialized hardware devices (e.g., 128 tensor processing unit (TPU) cores). However, such a heavy implementation may not be a viable option in environments with limited resources, and thus the electronic apparatus of one or more embodiments may use a powerful small network for real-world applications. Self-supervised learning may allow a deeper model to learn general visual representations more effectively with unlabeled data. In addition, it is empirically verified that a predictive performance of a bigger network is transferred better to a smaller one.

In one example, the electronic apparatus of one or more embodiments may train a lightweight network with rich representations by transferring knowledge from a deep self-supervised network, rather than training a small network independently.

Typical distillation methods in unsupervised representation learning methods may be associated with offline training in that feature information is transferred to a student model using an already trained self-supervised teacher model. In addition, to frequently boost performance, sequential training pipelines may need post-processing, such as, for example, k-means clustering. In one example, dissimilar to this approach, the electronic apparatus of one or more embodiments may use an unsupervised representation learning framework for small networks that combines self-supervised training and knowledge distillation within a single training process. For example, the teacher model may learn clusters and representations. Simultaneously, the student model may be trained such that predictions on clustering of the teacher model which is an on-the-fly self-supervised teacher model are aligned. A domain classifier may facilitate the training of the student model by useful and discriminative features invariant to a distribution shift between the teacher model and the student model. Empirically, increasing the number of different views during self-supervised training may improve the quality of resultant features. There are many multi-view generation approaches, and most of which may depend on random image transformation techniques. Hereinafter, training for using rich feature information included in a network itself will be described.

Hereinafter, training according to an example embodiment will be described in detail.

Figure 2:
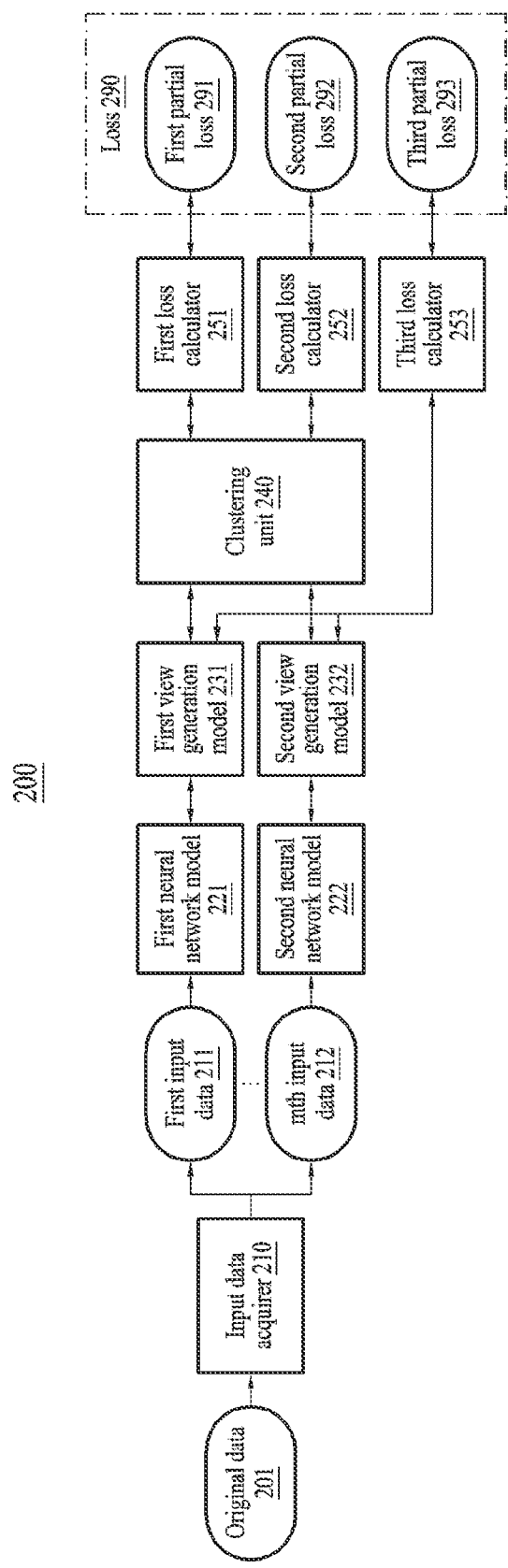
FIG. 2 illustrates an example of a training system.

FIG. 2 illustrates an example of a training system.

A training system 200 may include an input data acquirer 210, a first neural network model 221, a second neural network model 222, a first view generation model 231, a second view generation model 232, a clustering unit 240, a first loss calculator 251, a second loss calculator 252, and a third loss calculator 253. These may be modules illustrated for the convenience of description, and any or all operations thereof may be performed by a processor (e.g., a processor 1210 of FIG. 12 below).

The input data acquirer 210 may obtain input data. For example, the input data acquirer 210 may generate, from original data 201, sets of input data including first input data 211 through $m^{th}$ input data 212. The input data acquirer 210 may generate various sets of input data by applying different types of data augmentation to the original data 201. Data augmentation may refer to an operation of generating, from a same of the single original data 201, input data corresponding to different data representations (for example, various views). For example, the input data acquirer 210 may generate, from the original data 201 which is a color image obtained by a camera sensor, two or more sets of input data through data augmentation including one of random noise addition, image rotation, scale adjustment, image movement, random crop, and color distortion, or a combination of two or more thereof.

The first neural network model 221 and the second neural network model 222 may be neural network models that are configured and trained to output backbone feature data from input data. The number of parameters of the first neural network model 221 may be greater than the number of parameters of the second neural network model 222. The first neural network model 221 may exhibit a relatively greater level of performance than the second neural network model 222. The second neural network model 222 may be used to generate an inference result after training is completed (e.g., when the neural network model 222 is trained). The first neural network model 221 may also be referred to herein as a teacher model, and the second neural network model 222 may also be referred to herein as a student model.

The first view generation model 231 may diversify a view of first backbone feature data output from the first neural network model 221. For example, the first view generation model 231 may include a first projection model and/or a first drop model. An electronic apparatus may calculate first embedded data by projecting the first backbone feature data through the first projection model, and calculate first view data by projecting the first backbone feature data using the first drop model. The first drop model may include one or more dropout layers. The electronic apparatus may operate the first projection model by excluding the dropout layers from a propagation path when propagating data to the first view generation model 231, or operate the first drop model by including the dropout layers in the propagation path. The first embedded data may be data projected to a lower dimension than a dimension of the first backbone feature data, and the first view data may be data from which some features are dropped out.

The second view generation model 232 may diversify a view of second backbone feature data output from the second neural network model 222. For example, the second view generation model 232 may include a second projection model and/or a second drop model. The electronic apparatus may calculate second embedded data by projecting the second backbone feature data through the second projection model and calculate second view data by projecting the second backbone feature data using the second drop model. The second drop model may include one or more dropout layers. The second embedded data may be data projected to a lower dimension than a dimension of the second backbone feature data, and the second view data may be data from which some features are dropped out.

Non-limiting examples of the first projection model and the second projection model will be described in detail with reference to FIG. 4, and non-limiting examples of the first drop model and the second drop model will be described in detail with reference to FIG. 5.

The clustering unit 240 may determine a cluster to which embedded data is to be included. For example, the number of elements of a cluster vector C which is a prototype (for example, the number of clusters) may be defined as K, and the clustering unit 240 may determine a code value indicating a cluster to which embedded data belongs among K clusters. In this example, K may be an integer greater than or equal to 1. For example, the clustering unit 240 may generate a clustering result using a Sinkhorn-Knopp algorithm under an equipartition constraint.

The first loss calculator 251 may calculate a first partial loss 291 of a loss 290. The first partial loss 291 may include a cross loss between a cluster vector probability value associated with embedded data and/or view data calculated from the first neural network model 221 (e.g., the first embedded data and/or the first view data) and an assigned cluster (e.g., a cluster to which the first embedded data belongs).

The second loss calculator 252 may calculate a second partial loss 292 of the loss 290.

The second partial loss 292 may include a cross loss between a cluster vector probability value associated with embedded data and/or view data calculated from the second neural network model 222 (e.g., the second embedded data and/or the second view data) and an assigned cluster (e.g., a cluster to which the second embedded data belongs).

The third loss calculator 253 may calculate a third partial loss 293 of the loss 290. The third partial loss 293 may include an adversarial loss between the first embedded data calculated based on the first neural network model 221 and the second embedded data calculated based on the second neural network model 222. As the adversarial loss is minimized, a difference between a feature distribution of the first neural network model 221 and a feature distribution of the second neural network model 222 may be reduced.

In unsupervised visual representation learning, rich feature information may be used to solve various pretext tasks for which labels are obtained from image data itself. These methods may be classified into a plurality of categories based on types of the pretext tasks. In one example, training may be based on clustering.

By increasing the number of views during the training, the electronic apparatus of one or more embodiments may improve self-supervised learning performance. In one example, the training may be performed as described above in a way to obtain data of various views with respect to the first backbone feature data of the first neural network model 221 and the second backbone feature data of the second neural network model 222 based on dropout in addition to data augmentation on the original data 201.

In knowledge distillation from a self-supervised model, the training may be performed in a way to train a student model using a result of clustering on a teacher model to mimic a relatively similarity between data points in an embedding space of the teacher model. Thus, the electronic apparatus of one or more embodiments may train a neural network model in a self-supervised manner even when label information is not given.

In addition, the electronic apparatus may train neural network models such that a shift may not be readily discriminative between a domain of the teacher model and a domain of the student model using a domain classifier having a gradient reversal (GR) layer. The electronic apparatus may train discriminative features invariant to distribution changes between the teacher model and the student model. Hereinafter, a non-limiting example in which a first neural network model is a teacher model and a second neural network model is a student model will be described with reference to FIG. 3.

Figure 3:
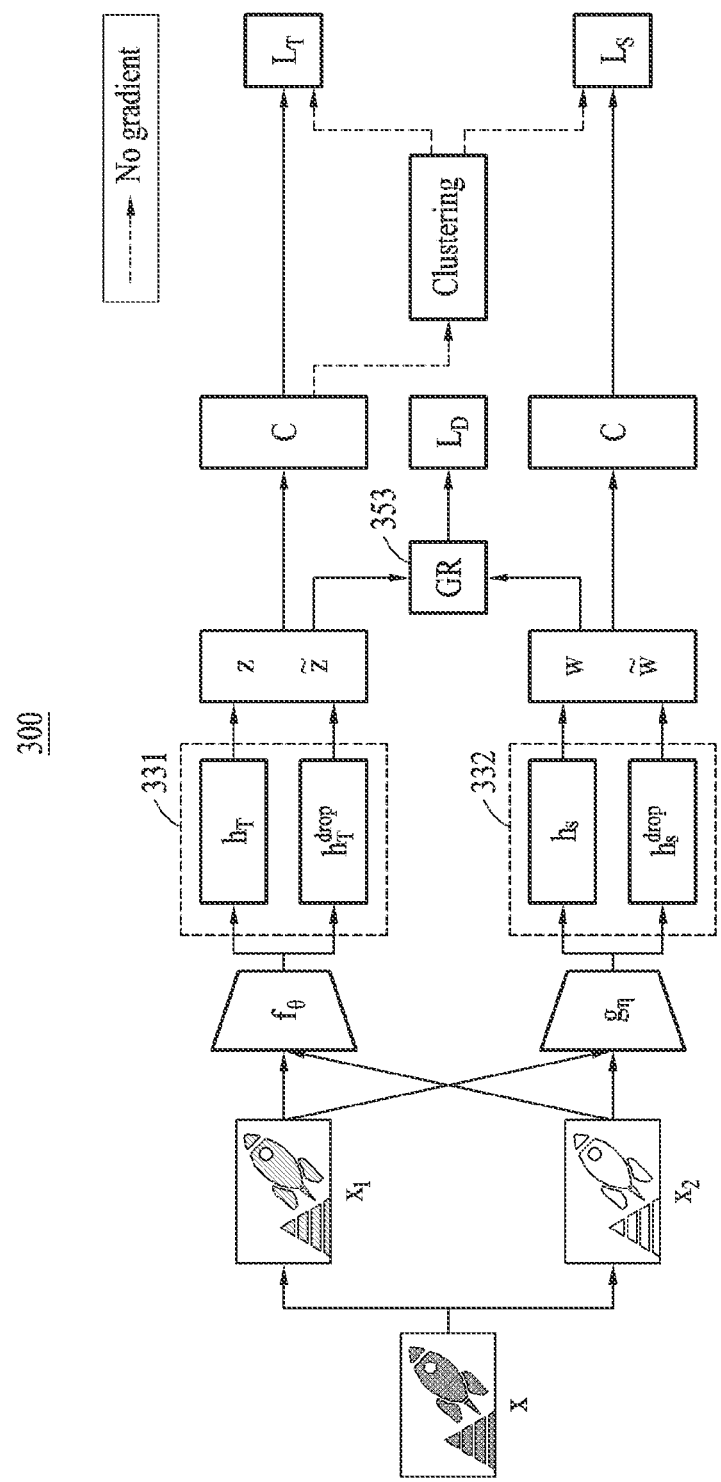
FIG. 3 illustrates an example of a training operation.

FIG. 3 illustrates an example of a training operation.

In one example, an electronic apparatus in a training system 300 may calculate a loss as represented by Equation 1 to train a teacher model $f_\theta$ (e.g., ResNet-50) and a student model $g_\eta$ (e.g., ResNet-18).

$$L = L_T + L_S + L_D \qquad \text{Equation 1:}$$

In Equation 1, $L_T$ denotes a first partial loss of the teacher model $f_\theta$, and $L_S$ denotes a second partial loss of the student model $g_\eta$. $L_D$ denotes a third partial loss used to reduce a difference in a feature distribution between the teacher model $f_\theta$, and the student model $g_\eta$. The electronic apparatus may feed-forward input data to calculate the partial losses described above. The electronic apparatus may calculate the first partial loss $L_T$ associated with a first neural network model and the second partial loss $L_S$ associated with a second neural network model, based on a cross entropy loss between a code value and any one of first embedded data, first view data, second embedded data, and second view data.

For example, input images $x_{n1}$ and $x_{n2}$ may be generated by applying data augmentation to an original image $x_n$. For example, as described above, input images $x_{n1}$ and $x_{n2}$ may indicate input data viewed at different views from the original image $x_n$ which is original data (e.g., where the input image $x_{n1}$ is of a first view, the input image $x_{n2}$ is of a second view, and the original image $x_n$ is of a third view). The electronic apparatus may feed-forward each of the generated input images $x_{n1}$ and $x_{n2}$ to both of the teacher model $f_\theta$ and the student model $g_\eta$, as respectively represented by Equations 2 and 3 below, for example. The number of parameters (e.g., the number of layers, the number of nodes, and/or the number of connection weights) of the teacher model $f_\theta$ may be greater than the number of parameters of the student model $g_\eta$. That is, a capacity of the teacher model $f_\theta$ may be greater and/or deeper than a capacity of the student model $g_\eta$.

$$f_{n1} = f_\theta(x_{n1}) \quad f_{n2} = f_\theta(x_{n2}) \qquad \text{Equation 2}$$

$$g_{n1} = g_\eta(x_{n1}) \quad g_{n2} = g_\eta(x_{n2}) \qquad \text{Equation 3}$$

In Equation 2 above, $f_{n1}$ denotes first backbone feature data extracted by applying the teacher model $f_\theta$ to the first input image $x_{n1}$, and $f_{n2}$ denotes first backbone feature data extracted by applying the teacher model $f_\theta$ to the second input image $x_{n2}$. As described above, the first backbone feature data may be backbone feature data that is extracted based on the teacher model $f_\theta$. In Equation 3 above, $g_{n1}$ denotes second backbone feature data extracted by applying the student model $g_\eta$ to the first input image $x_{n1}$, and $g_{n2}$ denotes second backbone feature data extracted by applying the student model $g_\eta$ to the second input image $x_{n2}$. As described above, the second backbone feature data may be backbone feature data that is extracted based on the student model $g_\eta$.

The electronic apparatus may propagate the first backbone feature data $f_{n1}$ and $f_{n2}$ to the first view generation model 331, and the second backboned feature data $g_{n1}$ and $g_{n2}$ to the second view generation model 332. For example, the electronic apparatus may calculate first embedded data $z_{n1}$ and $z_{n2}$, as represented by Equation 4 below, for example, from the first backbone feature data $f_{n1}$ and $f_{n2}$ based on a projection model $h_T$ of the first view generation model 331. The electronic apparatus may calculate second embedded data $w_{n1}$ and $w_{n2}$, as represented by Equation 5 below, for example, from the second backbone feature data $g_{n1}$ and $g_{n2}$ based on a projection model $h_S$ of the second view generation model 332.

$$z_{n1} = \frac{h_T(f_{n1})}{\|h_T(f_{n1})\|_2} \qquad \text{Equation 4}$$

$$z_{n2} = \frac{h_T(f_{n2})}{\|h_T(f_{n2})\|_2}$$

$$w_{n1} = \frac{h_S(g_{n1})}{\|h_S(g_{n1})\|_2} \qquad \text{Equation 5}$$

$$w_{n2} = \frac{h_S(g_{n2})}{\|h_S(g_{n2})\|_2}$$

As represented by Equations 4 and 5 above, each backbone feature data may be normalized. The electronic apparatus may calculate first view data $_{n1}$ and $_{n2}$ from the first backbone feature data $f_{n1}$ and $f_{n2}$, respectively, based on a drop model $h_T^{drop}$ of the first view generation model 331. The electronic apparatus may calculate second view data $\tilde{w}_{n1}$ and $\tilde{w}_{n2}$ from the second backbone feature data $g_{n1}$ and $g_{n2}$, respectively, based on a drop model $h_S^{drop}$ of the second view generation model 332. Herein, view data may be data in which some features are dropped out of backbone feature data, and will be described later with reference to FIG. 5.

The electronic apparatus may determine a result of clustering performed on embedded data. For example, the electronic apparatus may determine a cluster to which embedded data is to be included from among a plurality of clusters. A prototype cluster vector C may be defined as $\{c_1, \ldots, c_K\}$, for example, $C = \{c_1, \ldots, c_K\}$, in which K denotes the number of clusters indicated by the prototype cluster vector C. The electronic apparatus may determine a cluster to which embedded data is to be included from among prototype cluster groups using a Sinkhorn-Knopp algorithm under an equipartition constraint. For example, the electronic apparatus may calculate a code vector $q_n$ by mapping embedding representations of the teacher model $f_\theta$, for example, embedded data $z_n$, to the prototype cluster vector C. The code vector $q_n$ may include a code value indicating a cluster assigned to each embedded data. In the example of FIG. 3, the electronic apparatus may determine a code value $q_{n1}$ indicating a cluster to which first embedded data $z_{n1}$ calculated based on the teacher model $f_\theta$ belongs, and a code value $q_{n2}$ indicating a cluster to which first embedded data $z_{n2}$ belongs.

In one example, the electronic apparatus may predict a loss of the teacher model $f_\theta$ by exchanging clustering results between sets of input data of various views, in a similar way to swapping assignments between views (SwAV). The electronic apparatus may calculate a first partial loss $L_T$ based on a code value indicating a cluster to which embedded data extracted based on a first neural network model from one input data among two or more sets of input data belongs, and on first embedded data extracted based on the first neural network model from another input data among the two or more sets of input data. For example, the electronic apparatus may calculate a cross loss between the code value $q_{n2}$ and the first embedded data $z_{n1}$ and a cross loss between the code value $q_{n1}$ and the first embedded data $z_{n2}$, as represented by Equation 6 below, for example.

$$L_t(z_1, z_2) = \sum_n [L_c(z_{n1}, q_{n2}) + L_c(z_{n2}, q_{n1})] \quad \text{Equation 6}$$

The cross loss of Equation 6 may be calculated as represented by Equation 7 below, for example. For example, Equation 7 may represent a cross entropy value between the code value $q_{n2}$ and the first embedded data $z_{n1}$, and a cross entropy value between the code value $q_{n1}$ and the first embedded data $z_{n2}$ may also be calculated in a similar way.

$$L_c(z_{n1}, q_{n2}) = -\sum_k q_{n2}^{(k)} \log p_{n1}^{(k)} \quad \text{Equation 7}$$

$$p_{n1}^{(k)} = \frac{\exp\left(\frac{1}{\tau} z_{n1}^T c_k\right)}{\sum_{k'} \exp\left(\frac{1}{\tau} z_{n1}^T c_{k'}\right)} \quad \text{Equation 8}$$

In Equation 8 above, T denotes transpose. As represented by Equation 7 above, the electronic apparatus may determine, to be the cross entropy value between the code value $q_{n2}$ and the first embedded data $z_{n1}$, a cross entropy value between softmax probabilities for the code value $q_{n2}$ and the first embedded data $z_{n1}$. Equation 8 may represent a softmax probability having a temperature parameter of a dot product between all clusters of the prototype cluster vector C and the first embedded data $z_{n1}$. Although Equation 8 is described as representing the softmax probability of the first embedded data $z_{n1}$, examples are not limited thereto. For example, the electronic apparatus may also calculate a softwax probability for ith embedded data $z_{n1}$ calculated from ith input image. In this example, i denotes an integer greater than or equal to 1 and less than or equal to m. The first partial loss L of Equation 6 may be used to output a discriminative feature that is robust against a view change, such as, for example, data augmentation, in the teacher model $f_\theta$.

In one example, the electronic apparatus may predict a loss of the student model $g_\eta$ by exchanging clustering results between sets of input data of various views, in a similar way of predicting a cross loss for the teacher model $f_\theta$. The electronic apparatus may calculate a second partial loss $L_S$ based on a code value indicating a cluster to which first embedded data extracted based on a first neural network model from one input data among two or more sets of input data belongs, and on second embedded data extracted based on a second neural network model from another input data among the two or more sets of input data. For example, the electronic apparatus may calculate a cross loss between the code value $q_{n2}$ and the second embedded data $w_{n1}$ and a cross loss between the code value $q_{n1}$ and second the embedded data $w_{n2}$, as represented by Equation 9 below, for example.

$$L_s(w_1, w_2) = \sum_n [L_c(w_{n1}, q_{n2}) + L_c(w_{n2}, q_{n1})] \quad \text{Equation 9}$$

As represented by Equation 9, the electronic apparatus may calculate a cross entropy value with respect to the second embedded data $w_{n1}$ and $w_{n2}$ by referring to the code values $q_{n1}$ and $q_{n2}$ which are clustering results for the teacher model $f_\theta$. The cross entropy value, for example, Lc( ) may be calculated in a similar way as represented by Equations 7 and 8 above. The electronic apparatus may perform training such that the student model $g_\eta$, mimics the teacher model $f_\theta$ based on the second partial loss $L_S$ used for a prediction by exchanging the code values $q_{n1}$ and $q_{n2}$ which are clustering results for the teacher model $f_\theta$ from the second embedded data $w_{n1}$ and $w_{n2}$ of the student model $g_\eta$.

The electronic apparatus may update parameters of the teacher model $f_\theta$ and the student model $g_\eta$ to jointly minimize the first partial loss $L_t$ of Equation 6 above and the second partial loss $L_S$ of Equation 9 above.

In non-trivial online clustering, codes $q_n$ may be calculated using the Sinkhorn-Knopp algorithm under an equipartition constraint with respect to mini-batches having stored embeddings of size B as described above.

$$\max_{Q \in \mathcal{Q}} Tr(Q^T C^T Z) + \epsilon H(Q) \quad \text{Equation 10}$$

A code vector Qn of nth original data, for example, $Q_n = [q_{n1}; \ldots; q_{nB}]$, may be calculated by solving an optimization issue as represented by Equation 10 above, for example, on a transportation polytope $\mathcal{Q}$ with respect to given prototype cluster vectors $C = \{c_1, \ldots, c_K\}$ and $Z = [z_{n1}, \ldots, z_{nB}]$. In Equation 10, H denotes an entropy function as represented by Equation 11 below, for example, and e denotes a smoothing parameter.

$$H(Q) = \Sigma_{i,j} Q_{ij} \log Q_{ij} \quad \text{Equation 11:}$$

In Equation 11, the transportation polytope $\mathcal{Q}$ limited by a mini-batch may be given by Equation 12 below, for example.

$$Q = \left\{ Q \in \mathbb{R}_+^{K \times B} \mid Q 1_B = \frac{1}{K} 1_K, Q^T 1_K = \frac{1}{B} 1_B \right\} \quad \text{Equation 12}$$

In Equation 12, $1_K$ denotes a vector of ones (1s) of K dimensions.

In addition, the electronic apparatus may add a loss obtained by applying dropout to the first partial loss $L_t$ and the second partial loss $L_s$. For example, the electronic apparatus may calculate a first partial loss $L_T$ based further on view data extracted using the first neural network model from one input data from two or more sets of input data and on a clustering result. The electronic apparatus may calculate a loss between first view data $_{n1}$ and $_{n2}$ calculated based on dropout and a clustering result, as represented by Equation 13 below, for example.

$$L_{mv}(\hat{z}, \hat{z}) = \sum_n \sum_{i \in \{1,2\}} \sum_v [L_c(\hat{z}_{nv}, q_i) + L_c(\hat{z}_{nv}, q_i)] \quad \text{Equation 13}$$

In Equation 13 above, $\{\hat{z}_{nv}\}_{v=1}^V$ indicates small crop features, and $\{\hat{z}_{nv}\}_{v=1}^{V+2}$ indicates dropout features. The first partial loss $L_T$, which is a result of summation of Equations 6 and 13, may be represented by Equation 14 below, for example.

$$L_T(z_1,z_2,\tilde{z},\hat{z})=L_t(z_1,z_2)+L_{mv}(\tilde{z},\hat{z}) \qquad \text{Equation 14:}$$

Similarly, the electronic apparatus may calculate a second partial loss $L_S$ based further on view data extracted based on the second neural network model from one input data among two or more sets of input data and on a code value. For example, the electronic apparatus may calculate the second partial loss $L_S$ by calculating a summation of Equation 9 and $L_{mv}(\tilde{w},\hat{w})$ with respect to the student model $g_\eta$. Here, $L_{mv}(\tilde{w},\hat{w})$ may be calculated in a similar way as represented by Equation 13 above.

In one example, the electronic apparatus may reduce a difference in terms of a feature distribution between the teacher model $f_\theta$ and the student model $g_\eta$ by applying an adversarial loss.

A domain classifier D may include a multi-layer perceptron (MLP) having an output size of 2. The electronic apparatus may calculate a cross entropy loss between a feature label of 0 with respect to data output from the teacher model $f_\theta$ and of 1 with respect to data output from the student model $g_\eta$, and a softmax probability of an output of the domain classifier, as represented by Equations 15 and 16 below, for example.

$$L_D(z,w) = -\sum_n \sum_{i \in \{1,2\}} \left( \log d_{T,ni}^{(0)} + \log d_{S,ni}^{(1)} \right) \qquad \text{Equation 15}$$

$$d_{T,ni}^{(k)} = \frac{\exp(D^{(k)}(z_{ni}))}{\sum_{k' \in \{0,1\}} \exp(D^{(k')}(z_{ni}))} \qquad \text{Equation 16}$$

$d_{S,ni}^{(k)}$ in Equation 15 may be calculated using second embedded data $w_{ni}$, instead of (2) first embedded data $z_{n1}$, in Equation 16. For example, the electronic apparatus may calculate a third partial loss using a GR layer 353 from first embedded data and second embedded data. A last layer of a first view generation model of the teacher model $f_\theta$ and a last layer of a second view generation model of the student model $g_\eta$, may be connected to the domain classifier through the GR layer 353. The GR layer 353 may scale a gradient by a negative constant during backpropagation training.

In one example, the electronic apparatus may update parameters of the teacher model $f_\theta$, the student model $g_\eta$, and remaining layers based on the first partial loss $L_T$, the second partial loss $L_S$, and the third partial loss $L_D$. The electronic apparatus may not need to access a ground truth label in order to effectively learn online visual features of a small network. As described above, the electronic apparatus may integrate a knowledge distillation operation into a process of on-the-fly self-supervised learning.

Figure 4:
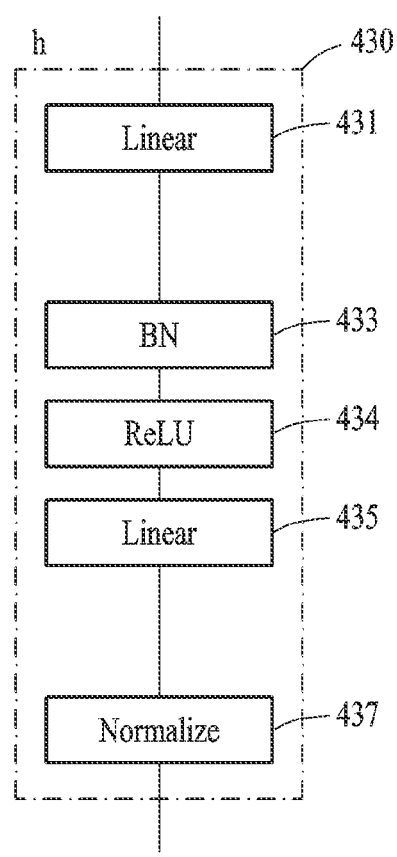
FIG. 4 illustrates an example of a projection model.
Figure 5:
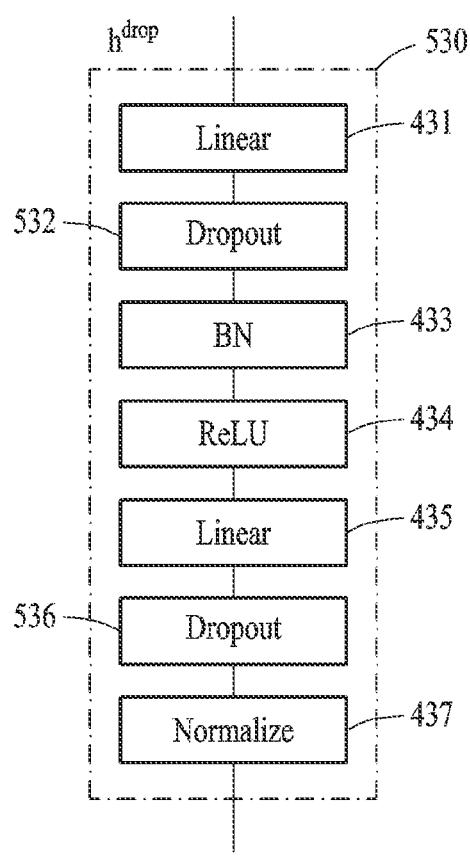
FIG. 5 illustrates an example of a drop model.

FIG. 4 illustrates an example of a projection model. FIG. 5 illustrates an example of a drop model.

In one example, an electronic apparatus may calculate projected first embedded data using a first projection model from first backbone feature data. The electronic apparatus may calculate projected first view data using a first drop model including one or more dropout layers from the first backbone feature data. The electronic apparatus may calculate projected second embedded data using a second projection model from second backbone feature data. The electronic apparatus may calculate projected second view data using a second drop model including one or more dropout layers from the second backbone feature data. The first projection model and the second projection model will be described in detail with reference to FIG. 4, and the first drop model and the second drop model will be described in detail with reference to FIG. 5.

For example, the electronic apparatus may calculate embedded data by applying a projection model h 430 to backbone feature data extracted by each neural network model, for example, a teacher model and a student model. The projection model h 430 may include a combination of a fully-connected layer, a convolution layer, an activation layer, a normalization layer, and the like. In the example of FIG. 4, the projection model h 430 may include a linear layer 431, a batch normalization (BN) layer 433, a rectified linear unit (ReLU) layer 434, a linear layer 435, and a normalization layer 437. However, examples of the projection model h 430 is not limited to the example of FIG. 4.

In one example, the electronic apparatus may calculate view data by applying a drop model $h^{drop}$ 530 to backbone feature data output by each neural network model. The view data may indicate data of another view that is different from that of projected embedded data. The drop model $h^{drop}$ 530 may be a model that further includes a dropout layer 532 in the projection model h 430. For example, the electronic apparatus may apply dropout layers 532 and 536 after applying the linear layers 431 and 435 to the first embedded data. The electronic apparatus may apply the dropout layers 532 and 536 after applying the linear layers 431 and 435 to the second embedded data. Although the drop model 530 is illustrated in the example of FIG. 5 as including the dropout layer 532 that precedes the ReLU layer 434 which is an activation layer and the dropout layer 536 that follows the ReLU layer 434, examples of which are not limited to the illustrated example. By the dropout layers 532 and 536, data of various views may be generated.

Figure 6:
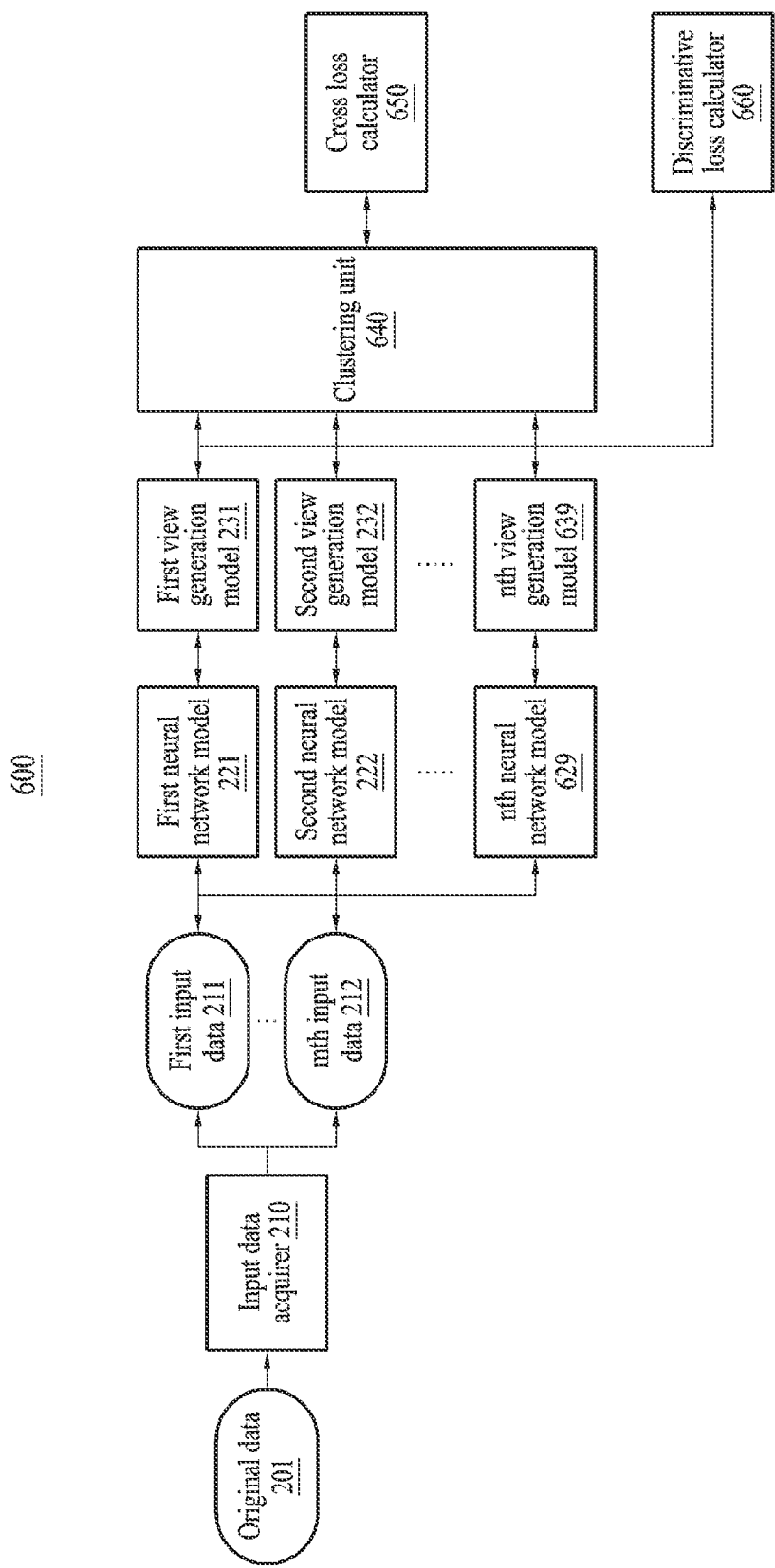
FIG. 6 illustrates an example of a training operation of a plurality of neural network models.

FIG. 6 illustrates an example of a training operation of a plurality of neural network models.

In one example, a training system 600 may include n neural network models 221, 222, and 629. The training system 600 may include view generation models 231, 232, and 639 respectively connected to the neural network models 221, 222, and 629. In the example of FIG. 6, the second neural network model 222 may be a student model, and the remaining models including the first neural network model 221 and third through nth neural network models may be a teacher model. However, examples are not limited thereto. The number of parameters may differ for each neural network model.

A clustering unit 640 may perform clustering on embedded data output from each of the view generation models 231, 232, and 639. A cross loss calculator 650 may calculate a cross loss in a similar way as represented in Equation 14 above. A code value used to calculate the cross loss in Equation 14 may be determined as follows. For example, the cross loss calculator 650 may determine one of a code value indicating a cluster to which embedded data output by a model having the highest recognition performance among a plurality of neural network models including a first neural network model and a second neural network model belongs, a code value indicating a cluster to which embedded data output from each model belongs, and a code value indicating a cluster to which embedded data output from a model with a least clustering loss belongs. The cross loss calculator 650 may calculate the cross loss between the determined code value and the embedded data, and use the obtained cross loss for backpropagation learning or training.

A discriminative loss calculator 660 may calculate an adversarial loss between embedded data output from one neural network model among the n neural network models and embedded data output from another neural network model among the n neural network models in a similar way as represented by Equation 15 above. Thus, the discriminative loss calculator 660 may perform training such that feature distributions of embedding spaces of the n neural network models become similar to each other.

The training system 600 may establish an ensemble of the n neural network models such that the second neural network model 222, the student model, is trained with sets of data of more various views.

Figure 7:
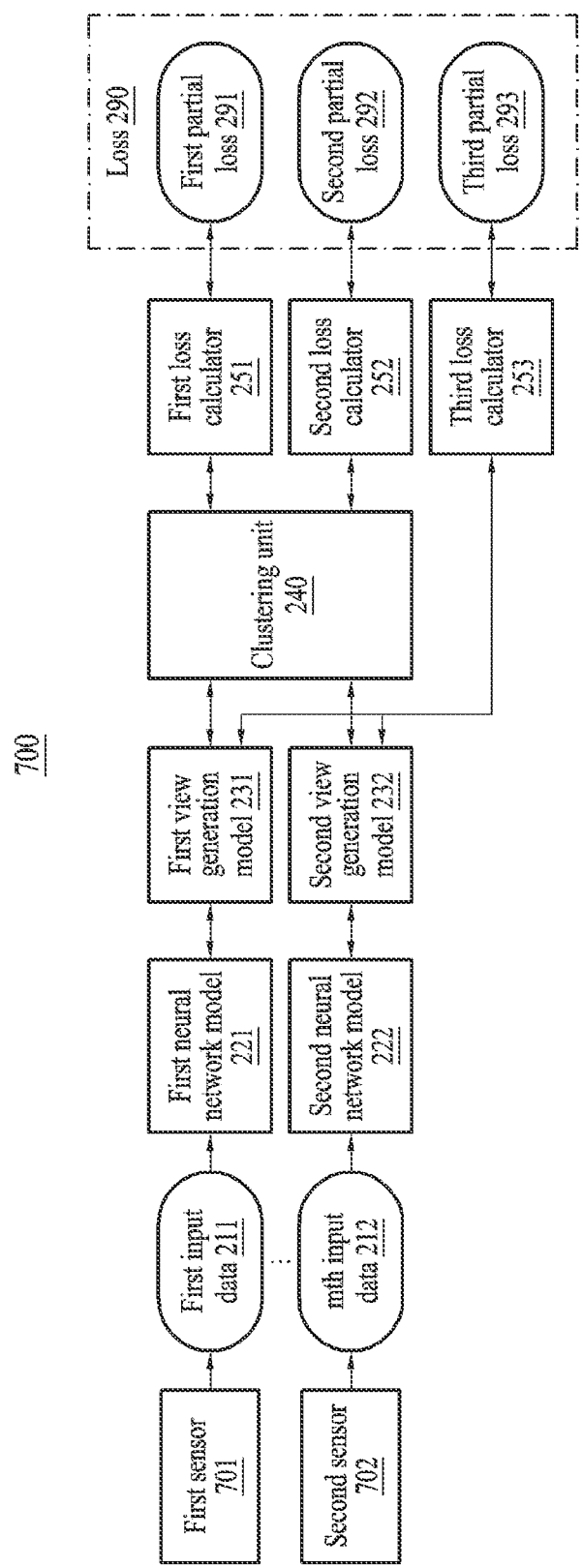
FIG. 7 illustrates an example of a training operation using data collected using heterogeneous sensors.

FIG. 7 illustrates an example of a training operation using data collected using heterogeneous sensors.

In one example, an electronic apparatus may generate one input data among two or more sets of input data by capturing a scene using one of a plurality of sensors. The electronic apparatus may also generate another input data among the two or more sets of input data by capturing the same scene using a sensor of another type among the sensors. For example, in a training system 700 illustrated in FIG. 7, the electronic apparatus may include a first sensor 701 and a second sensor 702. The first sensor 701 may be a camera sensor and the second sensor 702 may be a light detection and ranging (lidar) sensor, but examples of the first sensor 701 and the second sensor 702 are not limited to the foregoing examples. For example, the first sensor 701 and the second sensor 702 may be different sensors among, for example, an image sensor, a camera sensor, a lidar sensor, a radio detection and ranging (radar) sensor, and an infrared sensor.

For example, when training a neural network model with a camera image and a lidar image, the training system 700 may input the camera image and the lidar image generated by capturing the same scene at the same time to the first neural network model 221 and the second neural network model 222. The training system 700 may input, to the first neural network model 221, first input data 211 generated from the camera image. The training system 700 may input, to the second neural network model 222, $m^{th}$ input data 212 generated from the lidar image. In this example, m may be 2.

The training system 700 may generate the first input data 211 of various views by applying, to the camera image, size change, color distortion, random crop, and the like.

The training system 700 may generate two or more sets of the $m^{th}$ input data 212 based on data augmentation including one of or a combination of two or more of sensing point augmentation and reflection value adjustment from original data which is the lidar image obtained by the lidar sensor.

The first neural network model 221 may be a model configured a feature vector from an input image and may include, for example, a ResNet, MobileNet, RegNet, and the like. The second neural network model 222 may be a model configured to process point grey sequence data which is the lidar image and may include, for example, a PointNet, a long short-term memory (LSTM) model, and the like. For other operations not described with reference to FIG. 7, reference may be made to what is described above with reference to FIGS. 2 and 3.

Figure 8:
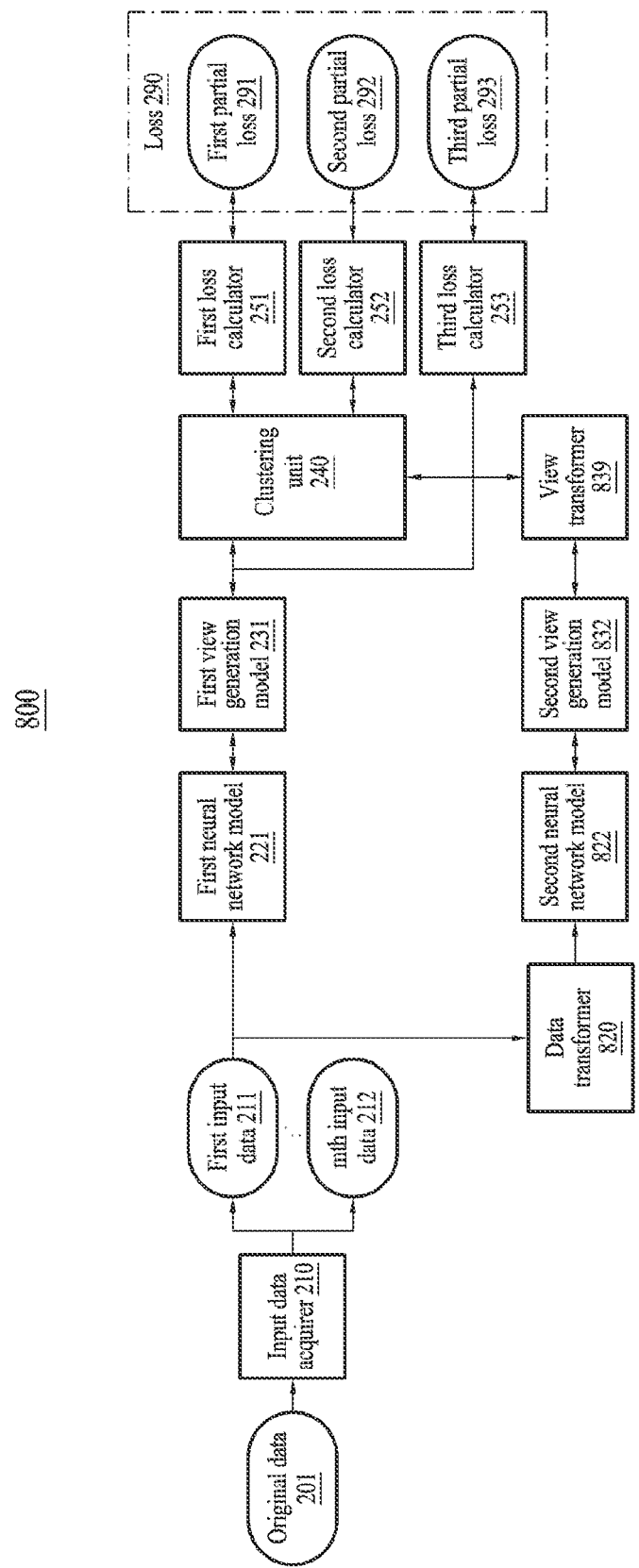
FIG. 8 illustrates an example of a training operation corresponding to target hardware.

FIG. 8 illustrates an example of a training operation corresponding to target hardware.

In one example, a training system 800 may further include a data transformer 820 and a view transformer 839. For example, the data transformer 820 may transform two or more sets of input data based on a format defined by target hardware.

For example, training based on generation of view data, training of a teacher model, clustering, calculation of a loss may be performed in a server and/or a personal computer (PC), and a second neural network model 822 for an actual inference operation may be implemented by an electronic apparatus with a lower performance, for example, a mobile terminal. For another example, a plurality of neural network models targeting different computing environments may be trained together. To train the neural network models with various hardware environments, data transformation for target hardware may be needed.

The data transformer 820 may transform first input data 211 through $m^{th}$ input data 212 based on an operation-based data form of target hardware, for example, a floating-point form, bit number, and the like. The data transformer 820 may input the transformed data to the second neural network model 822. The view transformer 839 may transform embedded data and view data output from a second view generation model 832 based on an operation-based data form of the training system 800, and provide the transformed data to a clustering unit 240 and for loss calculation. In addition, the data transformer 820 and the view transformer 839 may transform data according to characteristics of target hardware based on special sensor characteristics of the target hardware, for example, a color space difference, a Bayer pattern image, and the like.

Figure 9:
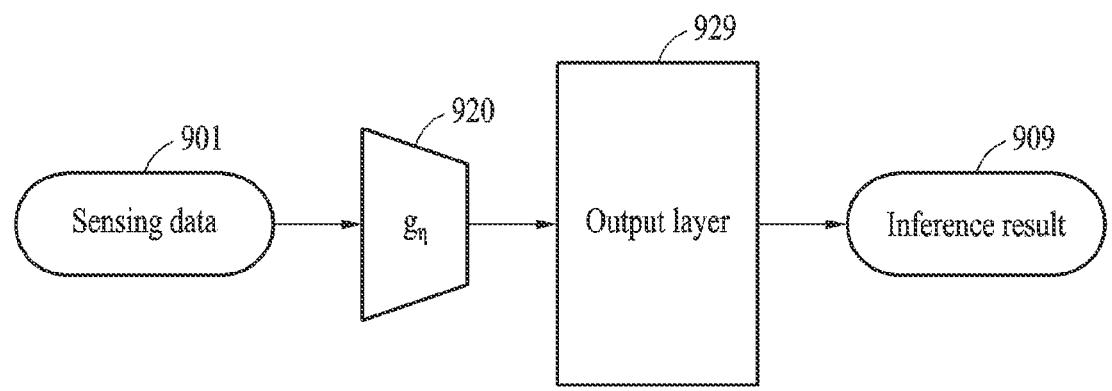
FIG. 9 illustrates an example of generating an inference result using a trained model.

FIG. 9 illustrates an example of generating an inference result using a trained model.

In one example, an electronic apparatus may perform an inference operation using a trained neural network model. For example, the electronic apparatus may generate an inference result 909 for a target task on sensing data 901, using embedded data extracted from the sensing data 901 based on a trained second neural network model 920. The electronic apparatus may generate the inference result 909 by propagating, to an output layer 929, the embedded data extracted from the second neural network model 920. The output layer 929 may be a layer having designed and additionally trained parameters to output the inference result 909 for the target task.

The sensing data 901 may be data collected by a sensor. The sensing data 901 may be, for example, image data, and be input to the second neural network model 920. The target task may include, for example, object detection, object classification, depth estimation, object recognition, identity verification, image detection, image segmentation, and the like. However, the target task is not limited to the foregoing examples, and may also include a task associated with autonomous driving or advanced driver assistance systems (ADAS), a task associated with internet of things (IoT) devices, and a task associated with a mobile phone, and a task associated with a television (TV).

The electronic apparatus may control an operation of the electronic apparatus storing therein the second neural network model 920 based on the inference result 909. For example, in a case in which the electronic apparatus is provided in a vehicle, the electronic apparatus may estimate a distance between the vehicle and an object based on a result of object detection, and change any one or a combination of any two or more of a speed, an accelerated speed, and steering of the vehicle or a combination of two or more thereof based on the estimated distance between the vehicle and the object. For another example, in a case in which the electronic apparatus is implemented by a mobile terminal, the electronic apparatus may cancel a locked state of the electronic apparatus to unlock the electronic apparatus when a user is verified as a preregistered user based on a result of identity verification. However, controlling an operation of the electronic apparatus is not limited to the foregoing examples, and the electronic apparatus may control various devices, modules, circuits, and/or functions that are accessible by the electronic apparatus, based on the inference result 909.

A second neural network trained as described above with reference to FIGS. 1 through 8 may exhibit improved performance in terms of, for example, accuracy, precision, recall, average precision, average recall, mean intersection over union, and the like.

FIGS. 10A through 10D illustrate examples of a discriminating power of a trained neural network model.

Figure 10A:
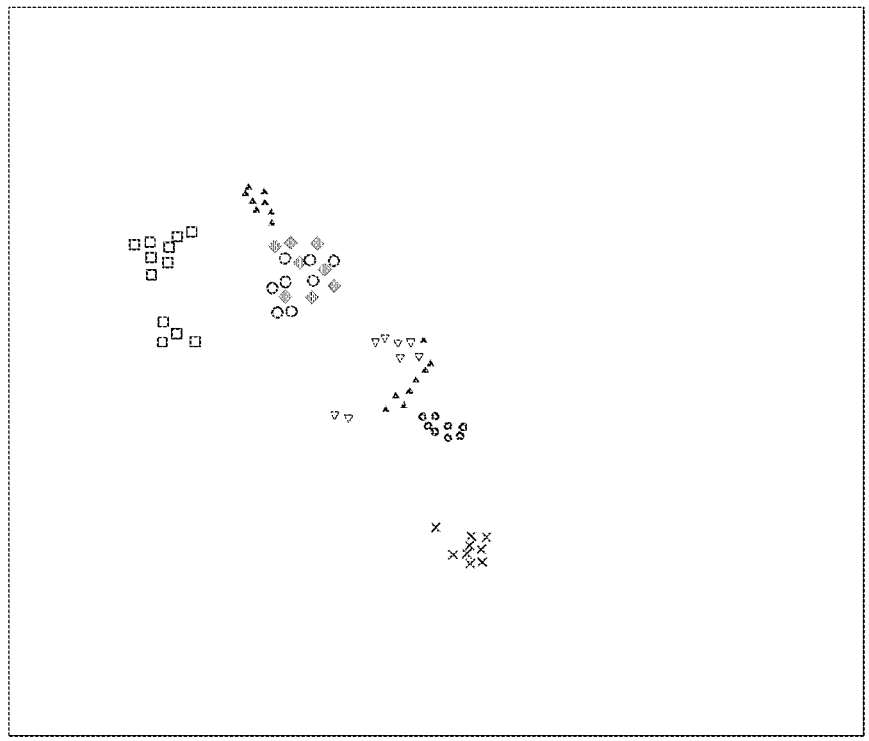
FIGS. 10A through 10D illustrate examples of a discriminating power of a trained neural network model.
Figure 10B:
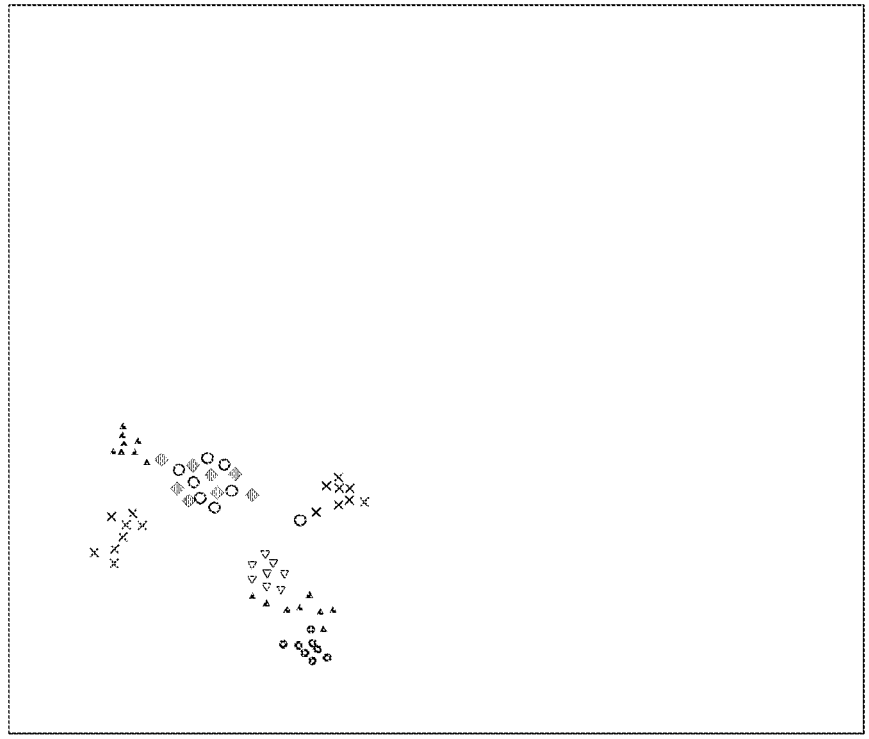
Figure 10C:
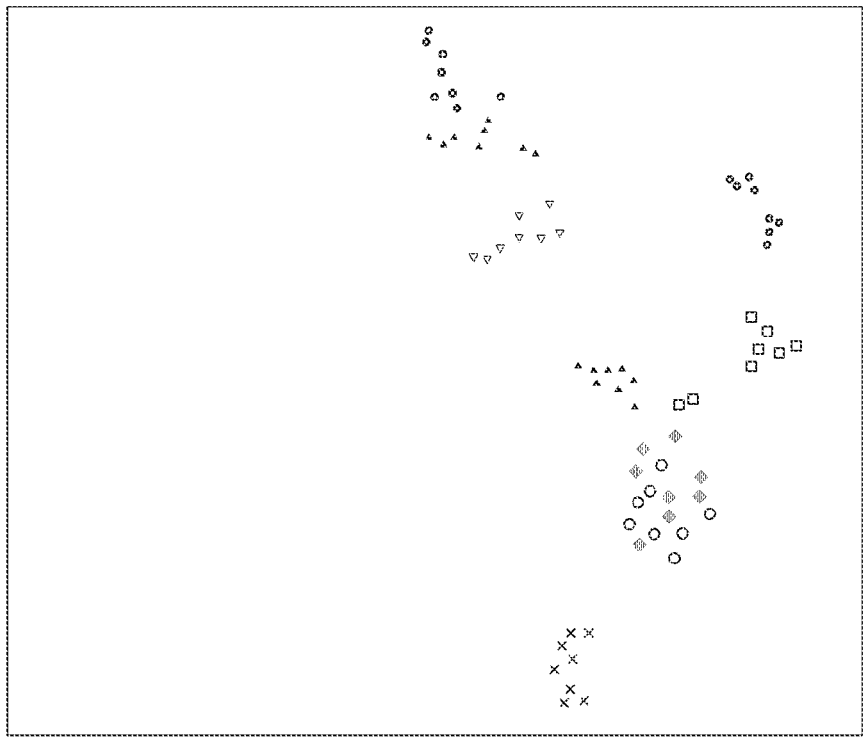
Figure 10D:
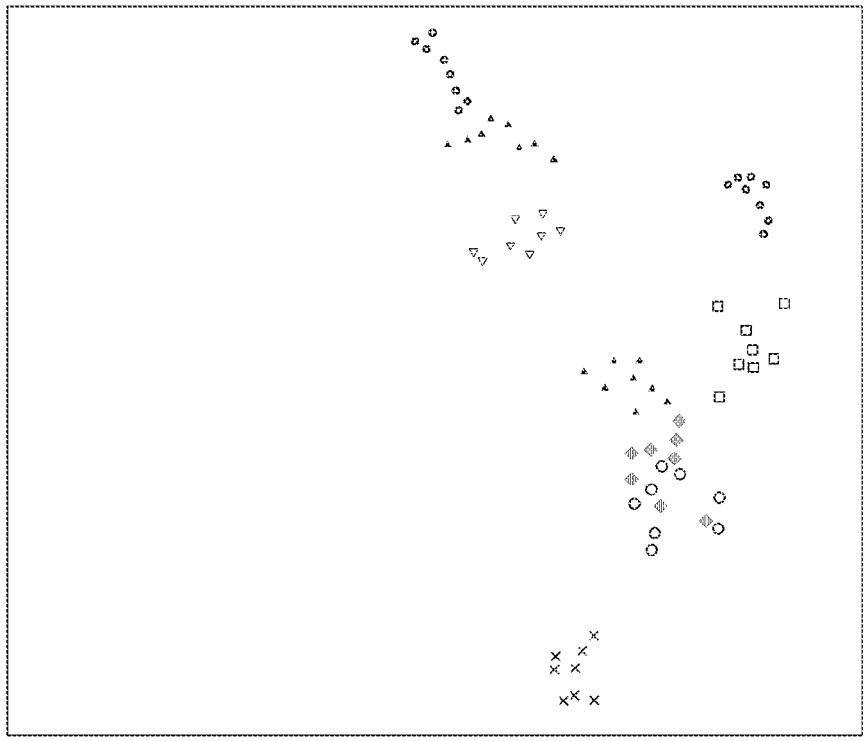

FIG. 10A illustrates a feature vector distribution 1000a in a case of training a big model alone. FIG. 10B illustrates a feature vector distribution 1000b in a case of training a small model alone. FIG. 10C illustrates a feature vector distribution 1000c of a teacher model. FIG. 10D illustrates a feature vector distribution 1000d of a student model.

Feature vectors are distributed in a wider region in the examples of FIGS. 10C and 10D than the example of FIG. 10B. Thus, more discriminative features may be contained compared to other classes. In addition, the feature vector distribution 1000d of the student model illustrated in FIG. 10D is similar to the feature vector distribution 1000c of the teacher model illustrated in FIG. 10C, and thus the student model may have a similar level of accuracy to that of the teacher model through knowledge distillation.

Figure 11:
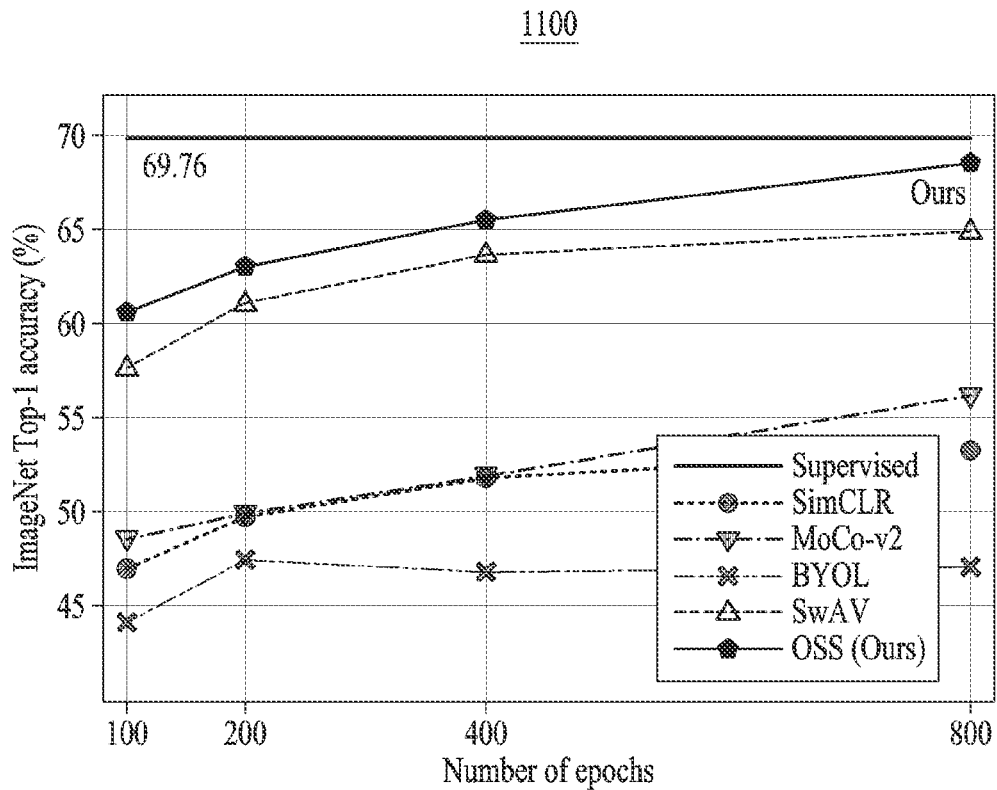
FIG. 11 illustrates an example of an accuracy of a trained neural network model.

FIG. 11 illustrates an example of an accuracy of a trained neural network model.

TABLE 1

| Method | Pretrained Epochs | | | |
| --- | --- | --- | --- | --- |
| | 100 | 200 | 400 | 800 |
| Supervised | | | 69.76 | |
| SimCLR | 47.12 | 49.90 | 51.78 | 53.35 |
| MoCo-v2 | 48.56 | 49.85 | 51.86 | 56.09 |
| BYOL | 44.22 | 47.48 | 46.81 | 47.05 |
| SwAV | 57.71 | 61.19 | 63.68 | 64.94 |
| OSS (ours) | 60.53 | 62.90 | 65.47 | 68.32 |

Table 1 indicates Top-1 accuracy (%) of a ResNet-18 model for each training method, which may be illustrated as a graph 1100 of FIG. 11. Referring to the graph 1100 of FIG. 11, a student model (e.g., OSS) exhibits desirable accuracy over all epochs. In one example, training may have considerably high recognition performance as conceptually simple and typical 256 batch training in a single eight graphics processing unit (GPU) machine.

In one example, a training apparatus may simultaneously train a plurality of neural network models that extracts data feature vectors or feature maps from unlabeled data through self-supervised learning, and train each of the neural network models with significant and rich representations. In addition, when training a single network model, the training apparatus may train the neural network model to output a more discriminative feature vector. The training apparatus may extract a feature vector that may ensure high-performance recognition accuracy in a small-size neural network model, with less computing resources.

Figure 12:
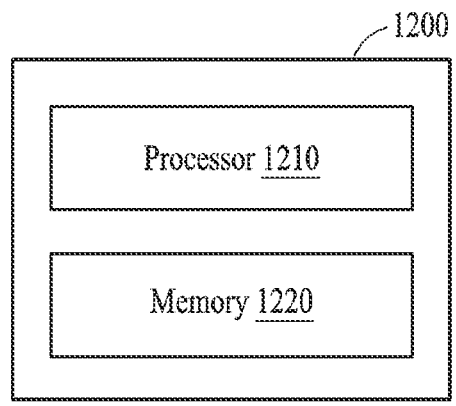
FIG. 12 illustrates an example of an electronic apparatus.

FIG. 12 illustrates an example of an electronic apparatus.

A neural network training apparatus, for example, an electronic apparatus 1200, may include a processor 1210 (e.g., one or more processors) and a memory 1220 (e.g., one or more memories).

The processor 1210 may calculate first backbone feature data corresponding to each input data by applying two or more sets of input data of the same scene, respectively, to a first neural network model. The processor 1210 may calculate second backbone feature data corresponding to each input data by applying the two or more sets of input data, respectively, to a second neural network model. The processor 1210 may calculate projection-based first embedded data and dropout-based first view data from the first backbone feature data. The processor 1210 may calculate projection-based second embedded data and dropout-based second view data from the second backbone feature data. The processor 1210 may train either one or both of the first neural network model and the second neural network model based on a combination of any two or more of the first embedded data, the first view data, the second embedded data, the second view data, and a code value indicating a cluster to which the first embedded data belongs. However, operations of the processor 1210 are not limited to the foregoing, and the processor 1210 may also perform the operations described above with reference to FIGS. 1 through 11.

The memory 1220 may store therein the first neural network model and the second neural network model. In addition, the memory 1220 may store, temporarily and/or permanently, data needed to perform the training described herein. The memory 1220 may store a temporary neural network model before the training is completed and also a neural network model obtained after the training is completed.

The neural network training apparatuses, electronic apparatuses, training apparatuses, training systems, input data acquirers, first neural network models, second neural network models, first view generation models, second view generation models, clustering units, first loss calculators, second loss calculators, third loss calculators, neural network models, view generation models, first sensors, second sensors, data transformers, view transformers, processors, memories, training system 200, input data acquirer 210, first neural network model 221, second neural network model 222, first view generation model 231, second view generation model 232, clustering unit 240, first loss calculator 251, second loss calculator 252, third loss calculator 253, training system 300, first view generation model 331, second view generation model 332, training system 600, neural network models 221, 222, and 629, view generation models 231, 232, and 639, training system 700, first sensor 701, second sensor 702, training system 800, data transformer 820, view transformer 839, second neural network model 822, second view generation model 832, electronic apparatus 1200, processor 1210, memory 1220, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with neural network training, comprising:
   determining first backbone feature data corresponding to each input data by applying, to a first neural network model, two or more sets of the input data of the same scene, respectively;
   determining second backbone feature data corresponding to each input data by applying, to a second neural network model, the two or more sets of the input data, respectively;
   diversifying, using plural projection models and plural drop models, a view of the first backbone feature data output from the first neural network model and a view of the second backbone feature data output from the second neural network model, including:
  determining, from the first backbone feature data, projection-based first embedded data using a first projection model and dropout-based first view data using a first drop model;
  determining, from the second backbone feature data, projection-based second embedded data using a second projection model and dropout-based second view data using a second drop model; and
training either one or both of the first neural network model and the second neural network model based on a loss determined based on a combination of any two or more of the first embedded data, the first view data, the second embedded data, the second view data, and an embedded data clustering result.

2. The method of claim 1, wherein the training comprises:
determining a first partial loss based on a code value indicating a cluster to which embedded data of the first embedded data extracted based on the first neural network model from one input data of the two or more sets of input data belongs, and on embedded data of the first embedded data extracted based on the first neural network model from another input data of the two or more sets of input data.

3. The method of claim 2, wherein the determining of the first partial loss comprises:
determining the first partial loss based further on view data of the first view data extracted using the first neural network model from one input data of the two or more sets of input data and a clustering result.

4. The method of claim 1, wherein the training comprises:
determining a second partial loss based on a code value indicating a cluster to which embedded data of the first embedded data extracted based on the first neural network model from one input data of the two or more sets of input data belongs, and on embedded data of the second embedded data extracted based on the second neural network model from another input data of the two or more input data.

5. The method of claim 4, wherein the determining of the second partial loss comprises:
determining the second partial loss based further on view data of the second view data extracted based on the second neural network model from one input data of the two or more sets of input data and on a code value.

6. The method of claim 1, wherein the training comprises:
determining a first partial loss associated with the first neural network model and a second partial loss associated with the second neural network model, based on a cross entropy loss between a code value and any one of the first embedded data, the first view data, the second embedded data, and the second view data.

7. The method of claim 1, wherein the training comprises:
determining a third partial loss using a gradient reversal (GR) layer from the first embedded data and the second embedded data.

8. The method of claim 1, further comprising:
generating, from original data which is a color image obtained by a camera sensor, the two or more sets of input data, based on data augmentation comprising any one or any combination of any two or more of random noise addition, image rotation, scale adjustment, image movement, random crop, and color distortion.

9. The method of claim 1, further comprising:
generating, from original data which is a light detection and ranging (lidar) image obtained by a lidar sensor, the two or more sets of input data, based on data augmentation comprising either one or both of sensing point augmentation and reflection value adjustment.

10. The method of claim 1, further comprising:
generating one input data of the two or more sets of input data by capturing a scene using a sensor among a plurality of sensors; and
generating another input data of the two or more sets of input data by capturing the same scene using a sensor of another type among the sensors.

11. The method of claim 1, comprising:
determining projected first embedded data from the first backbone feature data, using a first projection model;
determining projected first view data from the first backbone feature data, using a first drop model comprising one or more dropout layers;
determining projected second embedded data from the second backbone feature data, using a second projection model; and
determining projected second view data from the second backbone feature data, using a second drop model comprising one or more dropout layers.

12. The method of claim 11, wherein the determining of the first view data comprises:
applying a dropout layer after applying a linear layer to the first embedded data, and
the determining of the second view data comprises:
applying a dropout layer after applying a linear layer to the second embedded data.

13. The method of claim 1, wherein a number of parameters of the first neural network model is greater than a number of parameters of the second neural network model.

14. The method of claim 1, further comprising:
determining any one of a code value indicating a cluster to which embedded data output by a model having a greatest recognition performance among a plurality of neural network models comprising the first neural network model and the second neural network model belongs, a code value for each embedded data output by each of the models, and a code value indicating a cluster to which embedded data output by a model having a least clustering loss belongs.

15. The method of claim 1, wherein the determining of the second backbone feature data comprises:
transforming the two or more sets of input data based on a format defined by target hardware; and
inputting, to the second neural network model, transformed data obtained by the transforming.

16. The method of claim 1, wherein the training comprises:
updating parameters of the second neural network model such that the determined loss is minimized.

17. The method of claim 1, comprising:
generating an inference result of a target task of sensing data, using embedded data extracted from the sensing data based on the second neural network model for which the training is completed.

18. The method of claim 17, comprising:
controlling an operation of an electronic apparatus storing therein the second neural network model based on the inference result.

19. The method of claim 17, wherein the inference result corresponds to any one or any combination of an object recognition, an object classification, an identity verification, an object detection, and a language recognition.

20. A non-transitory computer-readable storage medium storing instructions that, when executed by a processor, configure the processor to perform the method of claim 1.

21. An apparatus with neural network training, comprising:
   a memory configured to store therein a first neural network model and a second neural network model; and
   a processor configured to
      determine first backbone feature data corresponding to each input data by applying two or more sets of the input data of the same scene, respectively, to the first neural network model,
      determine second backbone feature data corresponding to each input data by applying the two or more sets of the input data, respectively, to the second neural network model,
      diversifying, using plural projection models and plural drop models, a view of the first backbone feature data output from the first neural network model and a view of the second backbone feature data output from the second neural network model, including:
         determine, from the first backbone feature data, projection-based first embedded data using a first projection model and dropout-based first view data using a first drop model,
         determine, from the second backbone feature data, projection-based second embedded data using a second projection model and dropout-based second view data using a second drop model, and
      train either one or both of the first neural network model and the second neural network model based on a loss determined based on a combination of any two or more of the first embedded data, the first view data, the second embedded data, the second view data, and a code value indicating a cluster to which the first embedded data belongs.

22. A processor-implemented method with neural network training, comprising:
   determining first backbone feature data and second backbone feature data, respectively, by applying first and second input data of different views of a same scene to each of a first neural network and a second neural network;
   diversifying, using plural projection models and plural drop models, a view of the first backbone feature data output from the first neural network model and a view of the second backbone feature data output from the second neural network model, including:
      determining, from the first backbone feature data, first projection-based embedded data using a first projection model and first dropout-based view data using a first drop model, and determining, from the second backbone feature data, second projection-based embedded data using a second projection model and second dropout-based view data using a second drop model;
      determining a first partial loss based on the first embedded data and code values indicating one or more clusters to which the first embedded data belongs;
      determining a second partial loss based on the second embedded data and the code values; and
      training either one or both of the first neural network and the second neural network based on the first partial loss and the second partial loss.

23. The method of claim 22, wherein the code values comprise a first code value indicating a cluster to which embedded data of the first embedded data belongs, and a second code value indicating a cluster to which other embedded data of the first embedded data belongs.

24. The method of claim 23, wherein the determining of the second partial loss comprises
   determining a first cross loss between embedded data of the second embedded data and the second code value; and
   determining a second cross loss between other embedded data of the second embedded data and the first code value.

25. The method of claim 23, wherein the determining of the first partial loss comprises
   determining a first cross loss between the embedded data of the first embedded data and the second code value; and
   determining a second cross loss between the other embedded data of the first embedded data and the first code value.

* * * * *